Nov. 20, 1956  E. WILDHABER  2,770,973
MECHANICAL MOTION MECHANISM
Filed May 24, 1954  4 Sheets-Sheet 1

*INVENTOR:*
E. WILDHABER
BY
*Attorney*

Nov. 20, 1956  E. WILDHABER  2,770,973
MECHANICAL MOTION MECHANISM
Filed May 24, 1954  4 Sheets-Sheet 2
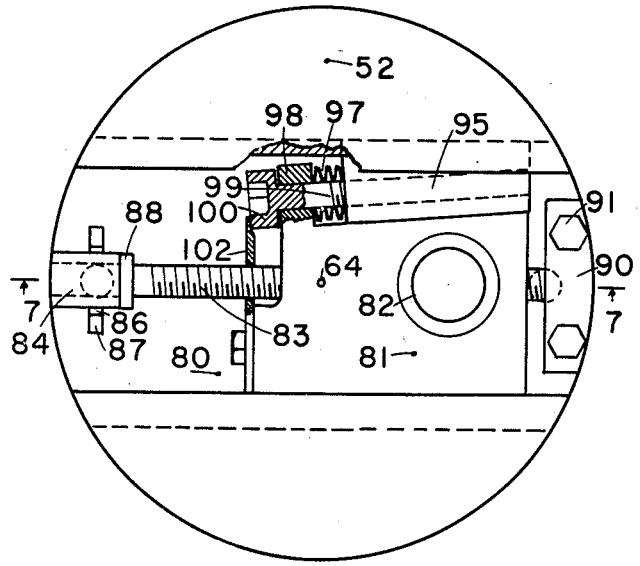
FIG. 6
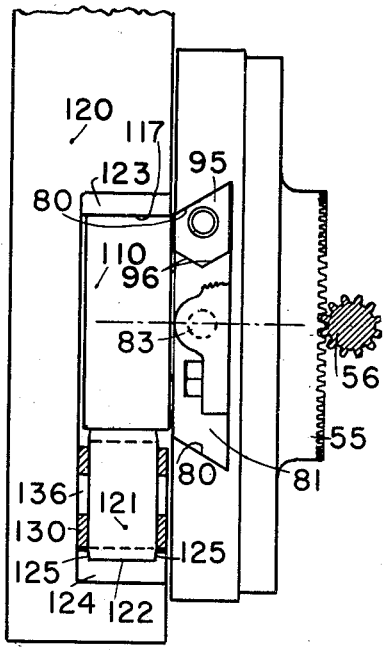
FIG. 8
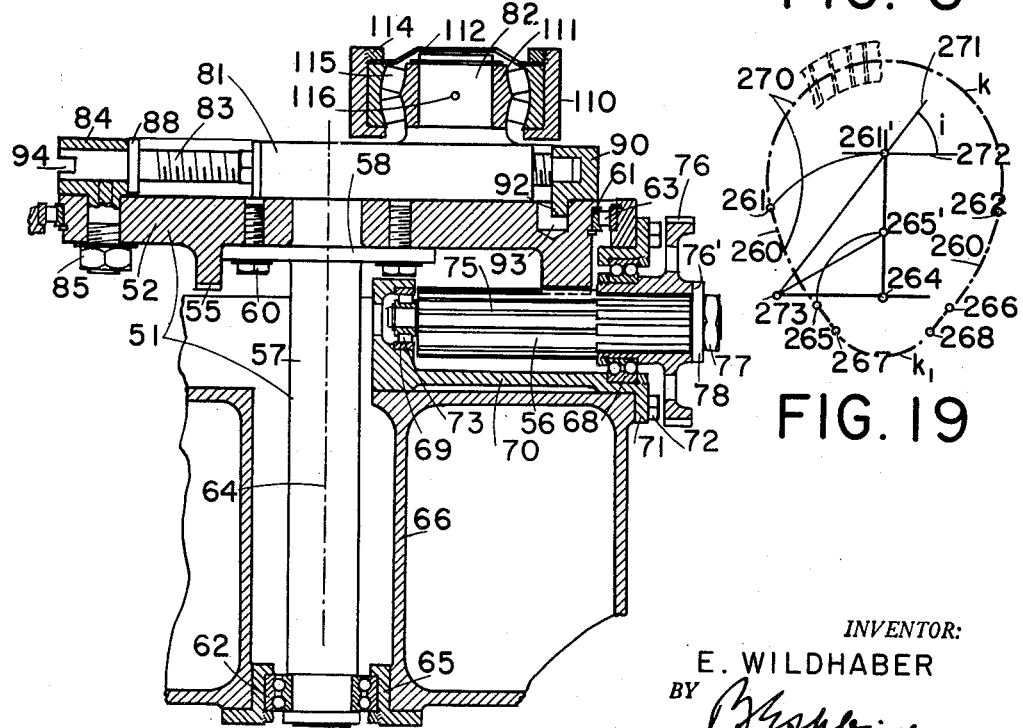
FIG. 7
FIG. 19
INVENTOR:
E. WILDHABER
BY
Attorney Nov. 20, 1956  E. WILDHABER  2,770,973
MECHANICAL MOTION MECHANISM
Filed May 24, 1954  4 Sheets-Sheet 3
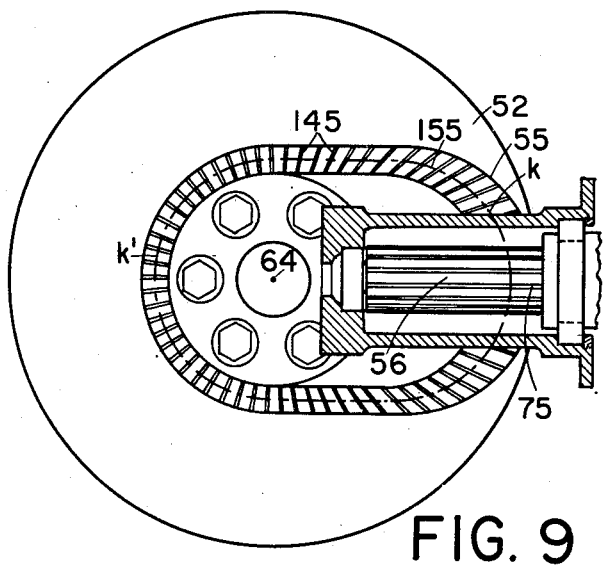
FIG. 9
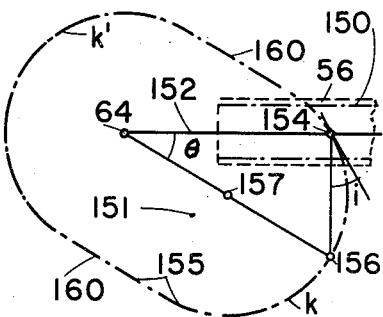
FIG. 10
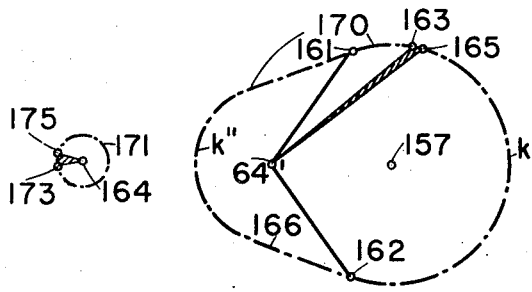
FIG. 11
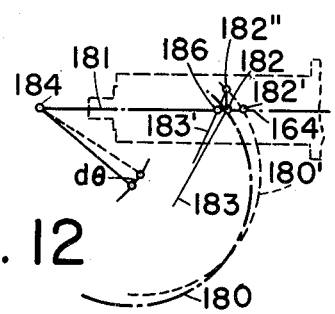
FIG. 12
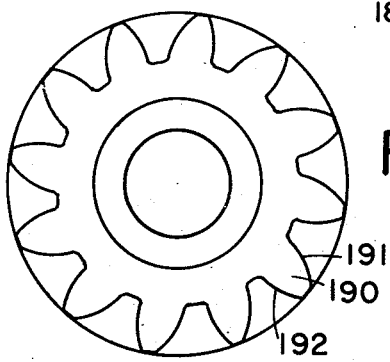
FIG. 15
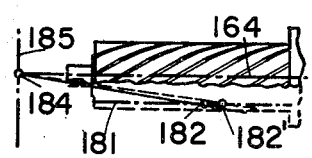
FIG. 14
FIG. 13
INVENTOR:
E. WILDHABER
BY
Attorney Nov. 20, 1956     E. WILDHABER     2,770,973
MECHANICAL MOTION MECHANISM
Filed May 24, 1954                           4 Sheets-Sheet 4

INVENTOR:
E. WILDHABER
BY
*Beshlinger*
Attorney

United States Patent Office 2,770,973
Patented Nov. 20, 1956

2,770,973

MECHANICAL MOTION MECHANISM

Ernest Wildhaber, Brighton, N. Y.

Application May 24, 1954, Serial No. 431,733

25 Claims. (Cl. 74—50)

The present invention relates to a mechanical motion, and more particularly to apparatus for effecting a predetermined reciprocation or oscillation at a changeable scale.

A primary object of the present invention is to provide simple and accurate mechanism for effecting reciprocation or oscillation in accordance with a predetermined pattern, and to provide adjustment means for changing the scale of the motion, that is, the stroke of the reciprocating or oscillating part, without changing this pattern, that is, without changing the nature of the motion.

A more specific object of the invention is to provide simple and accurate mechanism for effecting reciprocation or oscillation in which a rotary driver is employed and in which the principal portion of the stroke of the reciprocating or oscillating driven member in one direction is performed at a uniform rate, that is, at a rate directly and accurately proportional to the turning angle of the driver, and in which the stroke can be adjusted for length while retaining a uniform rate of travel.

Another object of the invention is to provide a mechanism for effecting adjustable reciprocation or oscillation in accordance with a predetermined fixed pattern, which includes a rotary driving member in the form of a crank having an adjustable crank pin, and varying ratio-reduction gearing for driving said member.

A still further object of the invention is to provide a mechanism of the character described in which backlash between the crank and the slide, that is driven thereby, is eliminated by a preload arrangement.

A most important object of the invention is to provide a mechanism of the character described which is adapted to be used for effecting timed motions, such as timed cutting motions or timed feed motions in machine tools.

Another object of the invention is to provide a novel varying-ratio reduction gearing adapted to form a part of the mechanism of this invention.

Another object of the invention is to provide a varying-ratio reduction gearing employing a cylindrical pinion and mating gear in which the motion cycle corresponds to a full turn of the gear, and which permits large accelerations.

Other objects of the invention will be apparent hereinafter from the specification and from the recital of the appended claims.

In the drawings:

Fig. 6 is a plan view of the end plate of a rotary crank member forming part of a mechanical motion device constructed according to another embodiment of the invention, parts being broken away;

Fig. 7 is an axial section through this device taken on the line 7—7 of Fig. 6 and looking in the direction of the arrows;

Fig. 8 is a side view of the device shown in Fig. 6, but showing how it may be connected to the reciprocatory slide, and showing, also, the means for preloading the device;

Fig. 9 is a rear view with parts broken away showing the drive means for the rotary crank member of Fig. 6;

Fig. 10 is a diagram explanatory of the varying ratio reduction gearing forming part of the invention;

Fig. 11 is a diagram further explanatory of said gearing and indicating a slightly modified aspect thereof;

Figs. 12 and 13 are diagrams illustrating the contact in said gearing, Fig. 12 being a view looking along the gear axis, and Fig. 13 being a view in a direction perpendicular to the axes of both the gear and the pinion;

Fig. 14 is a diagram showing a portion of Fig. 12 on an enlarged scale;

Fig. 15 is an end view of one form of helical pinion such as may be used in a device constructed according to one embodiment of the present invention;

Figure 2:
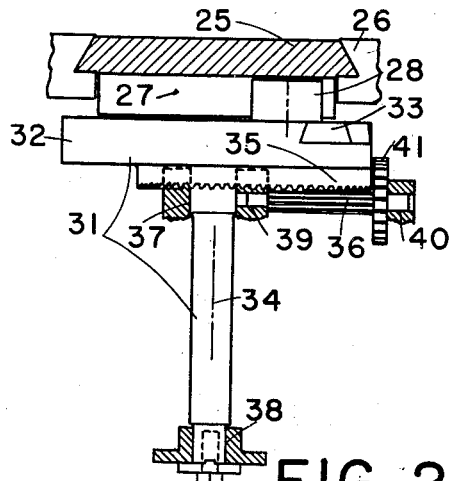
Fig. 2 is a part front view, part axial section of the mechanism shown in Fig. 1.
Figure 16:
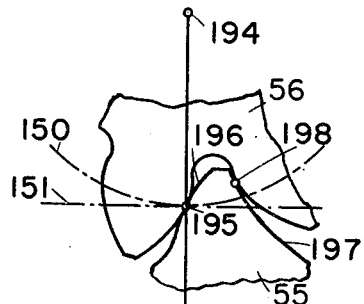
Figure 17:
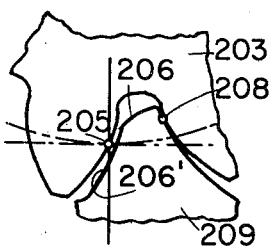
Figure 18:
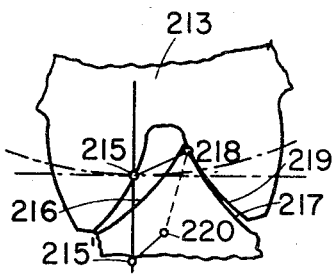
Figure 20:
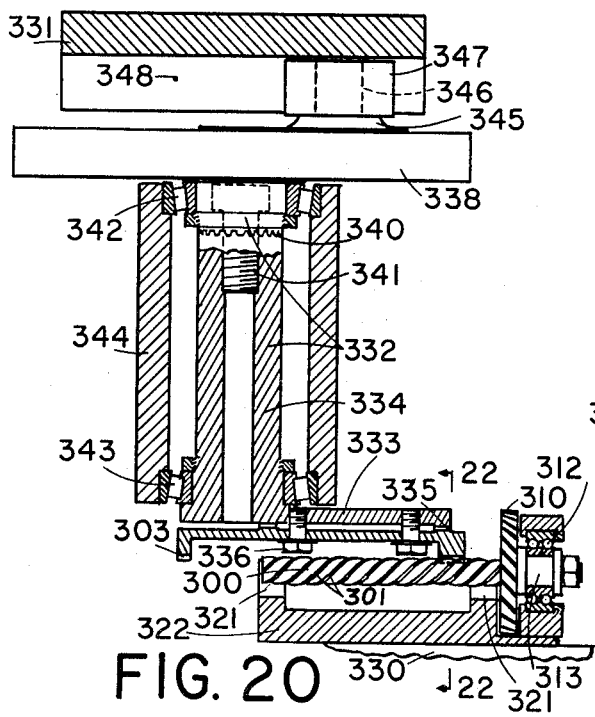
Figure 24:
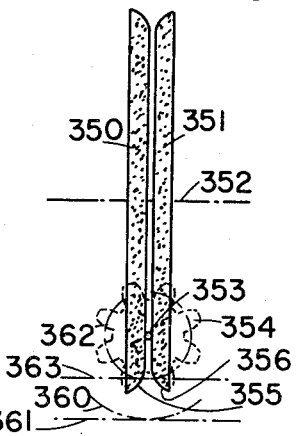
Figure 22:
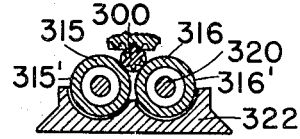
Figure 21:
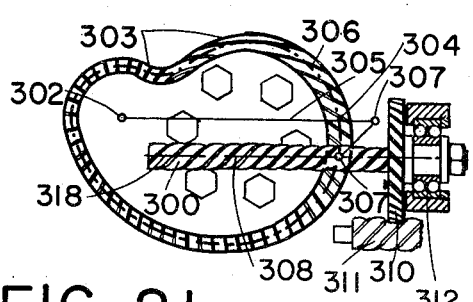
Figure 23:
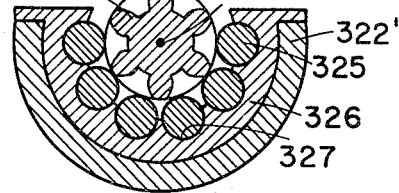

Figs. 16 to 18 inclusive are diagrams showing how undercut can be reduced or avoided on the gear teeth in spite of large accelerations by making the pinions sufficiently small, Fig. 16 showing a pinion proportioned according to the present invention in engagement with its gear, and Figs. 17 and 18 showing larger pinions in engagement with their gears;

Fig. 19 is a diagrammatic view of a modified pitch curve of a varying ratio face gear, showing a portion of the face gear in dotted lines;

Fig. 20 is an axial section, similar to Figs. 2 and 7 of a mechanical motion mechanism constructed according to a further embodiment of this invention;

Fig. 21 is a bottom view, similar to Fig. 9, of the varying ratio face gear and drive pinion in the embodiment of the invention shown in Fig. 20;

Fig. 22 is a section taken along the line 22—22 of Fig. 20 looking in the direction of the arrows;

Fig. 23 is a partial section similar to Fig. 22 but showing on an enlarged scale a further modification of the invention; and Fig. 24 is a diagram illustrating the production of a varying ratio face gear such as used in the mechanism of the present invention.

Figure 1:
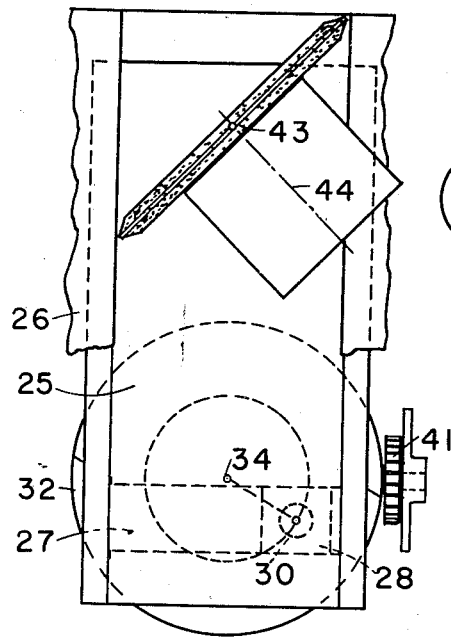
Fig. 1 is a fragmentary diagrammatic plan view showing a mechanical motion device constructed according to one embodiment of the present invention for reciprocating a slide which carries a grinding wheel.

The present invention is broadly and diagrammatically illustrated in Figs. 1 and 2 in connection with means for reciprocating a slide 25 which is movable in a straight line along and in guideways 26. Slide 25 has a straight slot 27 which extends transversely to the direction of reciprocation of the slide and preferably, as shown, at right angles to it. The plane sides of slot 27 are engaged by a sliding block 28 which is rotatably mounted on a crank pin 30. The crank pin is adjustably mounted on the enlarged head or plate 32 of a rotary member 31, and is rigid with the member 31 in operation. The crank pin forms part of a slide 33 which is adjustable radially on the head 32 toward and away from the axis 34 of the rotary member 31, but which is fixed to member 32 after adjustment.

The device of the present invention differs from a conventional Scotch yoke mechanism by a non-uniform drive of the rotary member 31. Hence, the motion of the slide 25 is not a harmonic motion. It is more nearly uniform, at least in one direction; and in a principal application of the invention it is exactly uniform.

In accordance with my invention the non-uniform rotation of the member 31 is effected by a pair of varying ratio gears 35, 36 having different tooth numbers. The larger gear 35 is rigid with the member 31. The other member of the pair is a pinion 36 with much fewer teeth than gear 35. The pinion is preferably a cylindrical pinion.

As will be described hereinafter, the gear 35 is preferably a varying ratio face gear with a plane pitch surface tangent to the cylindrical pitch surface of the drive pinion 36. The gear teeth follow a pitch line which is a closed curve extending around the gear axis 34 and having a varying distance therefrom.

This gear drive 36, 35 is a reduction drive as well as a varying ratio drive. The varying turning velocity of the gear repeats with each turn of the gear when the pinion is rotated at a uniform rate. A motion cycle corresponds to more than a full turn of the pinion, preferably four or more turns of the pinion. The number of pinion turns per motion cycle does not have to be an integral number. In other words, the number of teeth of the pinion does not necessarily have to be equally divisible into the number of teeth of the gear.

A varying-ratio drive of this kind, with the large accelerations required, is ordinarily impractical. I have discovered that it can be made operative by using small enough pinions. It is impractical at overall ratios of 1:1 up to 4:1; and it gradually improves with increasing ratio. This will be discussed further hereafter, for it is this feature of my invention which enables us to obtain the required varying ratio and the reduction in a single step, in a single gear mesh, with highest accuracy and even, also, with lowest cost, lowest weight and least space requirements. Also, because of the single step, the device is more rigid.

The gear is rotatably mounted in spaced bearings 37, 38; and the pinion is rotatably mounted in spaced bearings 39, 40. The pinion is driven through a gear 41 which is rigid with it.

The mechanism described may be used for effecting reciprocation of a slide for any purpose. For instance, in Fig. 1 the slide 25 is shown carrying a tool in the form of a grinding wheel 43 which is rotatably mounted on the slide for rotation on an axis 44. This wheel can readily grind helical teeth or helical threads on a blank mounted on an axis parallel to the direction of travel of the slide 25. The blank would rotate uniformly during the whole grinding process while the rotating grinding wheel would be fed in each stroke at a uniform rate in the direction of the work axis. At the end of each grinding pass the wheel, or the work, would be withdrawn depthwise from engagement, so that the grinding wheel would clear the work during the return stroke. In each complete grinding cycle, including the return stroke, the work would be geared to rotate through an integral number of pitches or teeth, so that the grinding wheel would enter a new tooth space on each grinding pass. This number should be prime to the tooth number of the blank, so that the whole gear can be ground in a single continuous operation without intermittent indexing. Some overtravel may be added to the stroke to obtain a work rotation through an integral number of pitches per cycle.

Tools with individual cutting edges can also be used in place of grinding wheels. Also the motion of the slide 25 may be at an angle to the axis of the work, even at a right angle. It may, for instance, also, represent the rack motion in a generating roll. It may be used, also, to effect generating motion through oscillation of a tool carrying member at a uniform rate and through either large or small angular strokes during the working pass.

Figure 3:
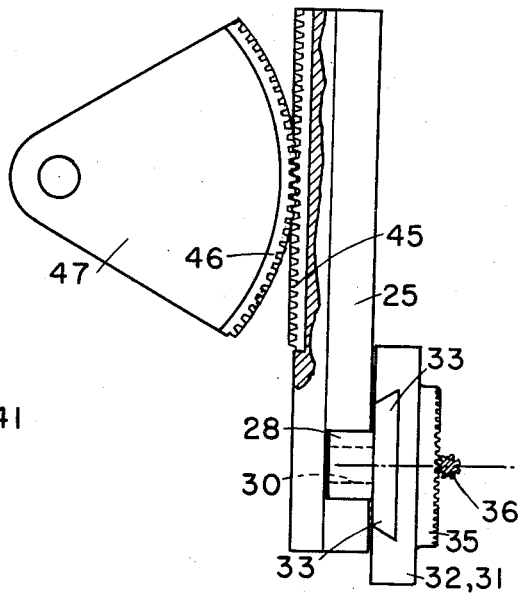
Fig. 3 is a side view with parts broken away, showing a modification of the invention adapted for producing adjustable oscillation.

Fig. 3 shows how this can be accomplished with a mechanism constructed according to one embodiment of the invention. Here the rotary member 31 with the adjustable crank pin 30, and the varying ratio gearing 35, 36 for driving member 31 may be the same as in Fig. 1. The slide 25 itself may also be the same, but instead of carrying a grinding wheel, the slide here carries a rack 45 which engages a gear segment 46. The segment 46 is rigidly secured to an oscillatory member 47 which may carry a grinding wheel or other tool (not shown).

The slide 25 has a uniform working stroke of adjustable length; and the rack 45 transmits the uniform motion to the gear segment 46. The latter then has a uniform angular velocity at any length of stroke within the design limits.

Figs. 6, 7 and 9 illustrate design features applicable to devices constructed according to the present invention, especially where the face gear is permanently secured to the rotary member and is not intended to be exchanged in normal service. Here the rotary member is denoted at 51; and the crank plate or head is indicated at 52.

The head 52 of the rotary member 51 is formed integral with the varying ratio face gear 55. The rotary member has a shaft portion 57 which has a flange 58 that is rigidly secured to the head 52 by means of screws 60 that thread into the head. The rotary member 51 is journaled adjacent one end in a large bearing 61 which receives and surrounds the periphery of head 52; and the rotary member is journaled at its opposite end in a bearing 62 in which the lower end of shaft portion 57 is mounted. Bearing 61 takes up radial load. It comprises cylindrical rollers 63 arranged with their axes parallel to the axis 64 of the member 51. Bearing 62 is made to take up radial load and also axial thrust loads in both directions. Its outer race is secured to an insert 65 which is fastened to the frame 66 by screws (not shown).

The rotary member 51 is driven by a cylindrical pinion 56 which is rotatably mounted in an axially fixed position by bearings 68 and 69. These bearings are secured in the member 70 which is inserted in a partial cylindrical bore of the frame 66. This member 70 has a flange 71 by which it is rigidly secured to the machine frame by screws 72. Bearing 68 is an anti-friction bearing adapted to take axial thrust loads in both directions as well as radial loads. It is located at a larger distance from the axis 64 of the rotary member 51 than the outside radius of said member. The other bearing 69 is located close to the axis 64 and at the opposite end of the pinion. It is disposed to take radial load only and contains cylindrical rollers 73.

The pinion 56 shown has straight teeth 75. More broadly its teeth are of constant profile shape from end to end. However, the teeth may be either straight or helical. A driving gear 76 is rigidly secured to the pinion 56 at the outer end of the pinion. The pinion teeth may extend to the outer end 76' of the gear 76, but the outside of the pinion blank within the hub of the gear is turned down or ground to form a shoulder against which the gear 76 is pressed by a screw 77 and washer 78. Screw 77 threads into the pinion shaft. The ground down teeth of the pinion act as splines engaging with internal teeth or splines in the gear 76 to rigidly connect the gear 76 to the pinion.

The pinion 56 is driven at a uniform rate by a pinion meshing with the gear 76 and not shown.

The head 52 contains a diametrical dove tail slot 80 (Fig. 8) in which a correspondingly shaped slide 81 is adjustable. The slide 81 carries a crank pin 82 (Figs. 6 and 7) which extends parallel to the axis 64 of the rotary member 51.

Adjustment of the slide 81 displaces the crank pin to different distances from the axis 64. This adjustment may be made by turning a screw 83 which engages an internal thread provided in the slide 81 and which is rotatably held at one end in a bearing 84. This bearing is rigidly connected with the head 52 by a nut 85 that threads onto a stem portion of the bearing. It is secured against turning by lateral projections 86 (Fig. 6) which fit into a slot 87 milled in the head 52 at the bottom of the dove tail slot 80.

The screw 83 is held in an axially fixed position by a collar 88 formed integral with it and in contact with the face of the bearing 84, and by contact at its opposite end with an abutment 90. This abutment is secured to the head 52 by screws 91 and by a short stem 92 (Fig. 7) which is formed integral with it and which projects into a hole 93. The screw is turned by applying a tool to its slot 94 shown at its left end in Fig. 7.

After adjustment the slide 81 is clamped to the head 52 by a wedge 95 which bears against one side of dove tail slot 80. On its opposite side it bears against a V-shaped guide surface 96 (Fig. 8) of the slide 81. The surface 96 is inclined lengthwise to provide a wedge. To obtain a constant and sufficient wedging action without overstress, the end pressure is applied on the wedge by spring means. A plurality of Belleville type disc springs 97 (Fig. 6) supply the pressure lengthwise of the wedge. They are supported by an ear 98 projecting from the slide 81. A screw 99 with a hexagonal opening in its head 100 threads into wedge 95. It is used for unclamping. As it is turned in a clockwise direction it screws itself further into the wedge and draws the wedge along the V-shaped guide surface 96 against the pressure of the springs, while its head bears against the ear 98. The clamping pressure on the dove tail sides of the slot 80 is thereby reduced to nearly nothing so that the slide can be adjusted freely. After adjustment the screw 99 is turned back until its head 100 starts to move away from the ear 98. The springs have then taken over completely and securely clamp the slide. A piece 102 secured to the slide 81 prevents the screw from working entirely loose in operation.

While clamping by spring means as described is at present preferred, any other known form of clamping and unclamping may also be used.

The offset position of the crank pin can be gauged or measured in any suitable known way as by a scale and vernier (not shown).

A cylindrical roller 110 (Fig. 7) is rotatably mounted on the crank pin 82 by means of an antifriction bearing 111. Its end is sealed by a disc 112 pressed to the outer race of the bearing 111 by a ring-nut 114. The bearing 111 is preferably of the self-aligning type. It has barrel-shaped rollers 115 rolling on an internal spherical surface centered at 116 on the axis of the roller.

A sliding block can also be used in place of a roller and mounted in the same way. In either case, the self-aligning bearing guarantees a load centered at 116 midway of the width of the bearing.

While the embodiment described with reference to Figs. 6 and 7 can be used for either a roller or sliding block, and with or without means for effecting preload, Fig. 8 specifically refers to a roller and to an arrangement for effecting preload.

Figure 4:
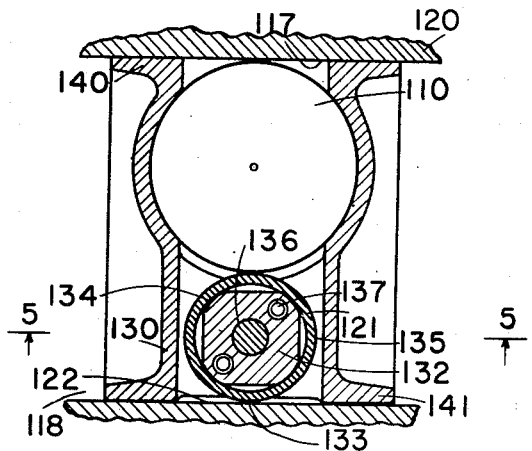
Fig. 4 is a fragmentary transverse section through the mechanism shown in Figs. 6, 7 and 8.
Figure 5:
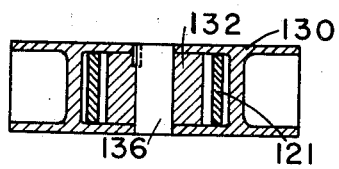
Fig. 5 is a section on the line 5—5 of Fig. 4 looking in the direction of the arrows.

The preloading means are further illustrated separately in Figs. 4 and 5. In this embodiment of the invention, the roller 110 contacts one side 117 (Fig. 4) of the slot 118 provided in a slide 120 (Fig. 8) and which extends transversely to the direction of motion of this slide. The opposite side of the roller 110 is engaged by a resilient roller 121 which furthermore contacts the opposite side 122 of said slot.

The resilient roller 121 illustrated is a relatively thin ring of steel, hardened and ground. In its unstressed state its outside surface and its inside surface are coaxial cylindrical surfaces. Preload deforms this ring, see Fig. 4, so that it has a somewhat elliptical or oval shape.

This roller is retained in position by a core 132 secured to the cage 130. The core 132 has square sides connected by diagonally disposed rounded portions 134. As the resilient ring is deformed through preload, its opposite contacting sides 133 approach each other under the load, but the sides 135 at right angles thereto expand and move away from each other. The portions opposite the rounded portions 134 of the core 132 are displaced the least, and are most suited for contact with the core.

The core is fastened to cage 130 by a pin 136 extending through the center of the core, and by two screws, that thread in the holes 137 (Fig. 4). The cage itself partially surrounds the roller 110, and has flange-like portions 140, 141 contacting the sides 117, 122 with a sliding fit. It may be made of plastic or other non-metallic material.

The two sides 117 and 122 of said slot 118 are formed on hardened or ground inserts, 123, 124 (Fig. 8) rigidly secured to the slide 120. Side 122 is recessed in the insert 124. The ends 125 of this recess are slightly sloped. They contact the end faces of the resilient roller 121. These end faces are slightly beveled to match the contacting surfaces 125 of the recess. Through the engagement with the ends of the recess, the resilient roller 121 and its cage 130 are held in position axially of the roller.

In operation, the cage is carried along by roller 110. Through its contact with the slot 118 it is kept at a constant angular position in the slot, and retains the resilient roller 121 in its proper position between roller 110 and the side 122 of the slot.

The slide 120 is movable like slide 25 of Fig. 1 in a straight path along guideways not shown in Fig. 8.

The varying ratio reduction gear for driving the crank is best seen in Fig. 9 which is a view along the gear axis 64. The gear is a face gear 55 with its teeth arranged in a plane perpendicular to its axis. Fig. 9 indicates the teeth 145 merely by their tops, which are simplified in the drawing and only show the general direction of the teeth.

Varying ratio gearing can be considered by looking at its pitch surfaces. The pinion 56 has a cylindrical pitch surface coaxial with it, which is a mean surface of the zone of the teeth. This pitch surface moves with the pinion and contacts a surface which moves with the gear. When the axis of the pinion is set at right angles to the axis of the gear, the last-named surface is a plane perpendicular to the gear axis. It is the pitch plane of the gear. The gear teeth follow this pitch plane, which is a mean plane of the tooth zone.

A cylindrical pitch surface 150 of the pinion and the mating pitch plane 151 of the crown gear is shown in Fig. 16. The pitch plane 151 is shown in the view along the gear axis 64 in the diagram of Fig. 10 where the outline of the pinion 56 is shown in dotted lines. The pitch cylinder 150 of the pinion contacts the pitch plane 151 of the gear in a straight line 152 (Fig. 10) which here passes through the gear center 64 and which is a projection of the pinion axis to the pitch plane. At all points of this line, the pinion and gear move in the same direction. At each instant they also move at the same velocity at some point of this line. This point will be called the pitch point. The position of this point varies. As the pinion turns and the gear turns on its axis in engagement therewith, the pitch point travels on the contact line 152 of the pitch surfaces, and describes a curve on the pitch plane of the rotating gear.

In the position shown in Fig. 10, the traveling pitch point is at 154, and 155 denotes the curve described by it on the pitch plane, that is, the pitch curve. The pitch curve describes the motion of the pitch point, the position of the pitch point at all turning angles of the gear, and thus it describes also the varying motion of the gear pair.

The pitch curve 155 of the gear is a closed curve which extends around the axis 64 of the gear at a varying distance therefrom. At the point 156 of maximum distance 64—156, its curvature radius 157—156 is smaller than said distance.

The teeth 145 (Fig. 9) of the gear are arranged along pitch curve 155, and their directions match the direction of the pinion teeth. Preferably the face width is kept larger in the region of larger distance from the gear axis than at the point of minimum distance.

With a mechanism as described and a radial distance of the crank pin from the turning axis of $r_o=64$—$156$ (Fig. 10), the instantaneous slide velocity $v$ is:

$$v = \omega_i r_o \cos\theta = \omega_i(64\text{—}154)$$

where $\omega_i$ is the instantaneous angular velocity, and $\theta$ is the turning angle. Accordingly the distance $r=64$—$154$ from the turning center 64 to the pitch point 154 is:

$$r = r_o \cos\theta$$

This is known to be the polar equation of a circle $k$ with its center at 157 midway between 64 and 156. Its radius is ½ $r_o$, one-half of its maximum distance 64—156 from the turning center 64. When extended this circle passes through center 64. Fig. 10 shows that at the pitch point 154 of the circular arcuate portion of the pitch curve its tangent is inclined to the peripheral direction 154—156 at an angle $i$ which is equal to the turning angle $\theta$.

It can be demonstrated mathematically that the trigonometric tangent of the angle $i$ is:

$$\tan i = -\frac{dr}{rd\theta}$$

Tan $i$ is an important factor controlling acceleration. The larger it is, the larger is the acceleration.

A large inclination $i$ presents a difficult problem as to gear teeth, so that the circular portion $k$ of the pitch curve can be used only in part. In the embodiment shown in Figs. 9 and 10 one-half of the full circumference of the circle $k$ is incorporated in the pitch curve 155. From there on the pitch curve continues as a different curve or line 160 here shown as a straight line tangent to a circle $k'$ centered on the gear axis 64. Accordingly this pitch line 155 is composed of the following different curves or lines which preferably have the same direction or tangent at their junctures: circle $k$ centered at 157, circle $k'$ centered at 64, and the parallel straight lines 160 connecting these circles.

In this case, the inclination $i$ of the pitch curve at the juncture of the circular portion $k$ with straight lines 160 is 45° with plus and minus signs on the opposite sides. The angle $i$ gradually decreases between this juncture and the juncture with the circular portions $k'$. At the latter juncture it is zero. The pitch line portion $k'$ corresponds to a uniform turning motion of the face gear.

The important part of the pitch curve, the working portion which results in a uniform slide velocity, is the circular portion $k$. The other portions can be chosen at will. Also uniform motion at the inner portion $k'$ can be dispensed with if desired.

The pitch curve indicated in Figs. 9 and 10 is intended for a relatively rapid motion. Here the maximum angular velocity of the face gear is twice the minimum angular velocity, since distance 64—156 is twice the radius of circle $k'$.

Fig. 11 shows a pitch curve intended for slower motion. Here more than half the complete circumference of the circle $k$ is used in the pitch curve 170 of the gear, namely, the arc between points 161 and 162. This pitch curve also contains an arc of a circle $k''$ concentric with the center 64' of the crown gear, and smaller than circle $k'$ of Fig. 10. It also contains connecting portions 166 between the two circles $k$ and $k''$.

In Fig. 11, the pitch circle of the pinion is shown at 171.

To determine how the turning angles of the pinion and gear correspond to each other, let us consider two points 163 and 165 of the pitch curve 170 of the gear, which are at an infinitesimal distance from each other. Their distance in peripheral direction, that is, in a direction at right angles to radius 64'—163 is the same as the peripheral distance of the corresponding points 173, 175 of the cylindrical pitch surface 171 of the pinion. This is because the gear and pinion have the same peripheral velocity at any pitch point where they are in contact.

On the gear, the peripheral distance of the points 163, 165 equals the product of the pitch radius $r=(64'\text{—}163)$ and the change in turning angle $d\theta=(163\text{—}64'\text{—}165)$ of the gear, in radian measure. It is:

$$rd\theta$$

This term is equal to the peripheral distance 173—175 on the pinion, and this is equal to the product of the pinion pitch radius $r_p$ and the change in turning angle of the pinion $d\theta'$.

Accordingly:

$$rd\theta = r_p d\theta'$$

and:

$$\int rd\theta = r_p \text{ arc } \theta'$$

This equation permits of determining the turning angle of the gear from a given shape of the pitch line.

In the circular portion $k$ of the pitch line specifically illustrated:

$$r = r_o \cos\theta$$

and $$\int rd\theta = r_o \int \cos\theta d\theta = r_o \sin\theta$$

where $\theta$ is measured as shown in Fig. 10.

This result is also directly obtainable from Fig. 10. At the considered radial setting $r_o$ equal to 64—156 of the crank pin, the displacement obtained is $r_o \sin\theta$; and this is equal to $r_p$ arc $\theta'$.

Effect of pitch curve inclination

The pitch curve inclination tends to unbalance the tooth action on the opposite sides of the teeth, and to produce undercut on one side of the teeth. If no attention is paid to this, one side of the teeth may be completely destroyed in a region of large inclination $i$.

The pitch curve portion 180 of the gear, shown in dash and dot lines in Fig. 12, intersects the contact line 181 of the pitch surfaces of gear and pinion at pitch point 182. 183 is the common normal of the gear and pinion at the pitch point 182.

Let us assume that the pinion has helical teeth, to obtain a more general result, which is applicable, however, to both helical and straight teeth. In the position considered, the gear and pinion have an instantaneous axis 182—184 (Fig. 13), for in any one instant their relative velocity is as on a pair of bevel gears. 184 is the kinematic apex of this imaginary bevel gear pair, and the intersection point of the gear axis 185 with the pinion axis 164.

After an infinitesimal turning angle $d\theta$, the pitch curve of the gear has a position 180' (Fig. 12) and intersects line 181 at a new pitch point 182'. 182'—184 (Fig. 13) is the new instantaneous axis. Point 182 has then moved to a position 182'' at a distance $rd\theta$ from point 182.

We now want to determine the inclination of the normal to the pitch plane in such a way that the normal stays in contact also in the position 183', when it passes through point 182''. This inclination will be called the limit pressure angle at the considered pitch point 182.

The normal 183' is in a position of contact when it passes through the new instantaneous axis 182'—184. Point 186 (Fig. 12) is then a point thereof. This point has an elevation from the pitch plane equal to the product of the projected distance 182'—186 and tan $\gamma$, where $\gamma$ is the inclination of the instantaneous axis to the pitch plane. Obviously:

$$\tan\gamma = \frac{r_p}{r}$$

because point 182' is at an infinitesimal distance from point 182.

Fig. 14 shows the infinitesimal region about point 182 (Fig. 12) on a greatly enlarged scale. The projected distance 182''—186 of the normal 183' is seen to be:

$$182''\text{—}186 = \frac{182'\text{—}182''}{\cos\psi} = \frac{rd\theta}{\cos\psi}$$

where $\psi$ denotes the helix angle of the pinion teeth on their pitch surface. With the elevation (186'—182') tan $\gamma$ of point 186 from the pitch plane, the trigonometric tangent of the limit pressure angle $\varphi_0$ is obtained as:

$$\tan \phi_0 = \frac{(186-182') \tan \gamma}{(182''-186)} = \frac{rd\theta(\tan i + \tan \psi)}{rd\theta/\cos \psi} \cdot \tan \gamma$$

$$\tan \phi_0 = \frac{r_p}{r}(\tan i + \tan \psi) \cos \psi \qquad (1)$$

and in the special case of straight teeth, where $\psi=0$, it is:

$$\tan \phi_0 = \frac{r_p}{r} \tan i \qquad (1a)$$

With uniform motion face gears, the angle $i$ is zero, so that with straight teeth $\varphi_0=0$, as well known. Also known is that this limit case of a pressure angle equal to the limit pressure angle would result in an infinite relative curvature of the tooth profiles at the pitch point, that is, the curvature radius of the gear tooth profile would be zero. Equal positive pressure angles then differ equally from the limit pressure angle and give a balanced tooth action on the two sides. The path of contact is equally inclined on the two sides and inclined like the tooth normals.

These conditions are changed as soon as the limit pressure angle differs from zero. Then equal pressure angles result in unequal tooth action. The paths of contact are unequally inclined to the pitch plane. With a pressure angle equal to the limit pressure angle $\varphi_0$, so that on one side the tooth normal coincides with the limit normal above determined, the path of contact has zero inclination to the pitch plane and infinite relative curvature results. That should be avoided.

As angle $i$ is positive on one portion of the pitch curve and negative on the opposite portion, one side of the teeth of the gear is exposed to these difficulties in one portion, and the other side of the gear teeth is exposed to them in the opposite portion. With straight teeth and a symmetrical pitch curve, the two sides have equal difficulties in symmetrical turning positions. With helical teeth (Figs. 12 to 14) one side fares better than the other, as indicated in Equation 1. This favored side has a reduced limit pressure angle. Its trigonometrical tangent is proportional to the difference of tan $i$ and tan $\psi$.

On unidirectional drives a moderate difference in favor of the driving side is acceptable. My invention provides two courses to more nearly equalize the tooth action and curvature of opposite tooth sides.

In one of these the pressure angles of the two sides are made unequal, so that the more difficult side has a larger pressure angle than the opposite side. This tends to make the pressure angle difference from the limit pressure angle more nearly equal on the two sides. The other course is to use a pinion axis offset from the gear axis, as will be described hereinafter.

Fig. 15 is an end view of a helical pinion of a varying ratio gear drive. It is seen that the teeth 190 lean slightly, side 191 having a larger pressure angle than side 192. The figure can be considered an end view looking from the gear axis to the inner end of a right hand helical pinion. Here the side driving in clockwise direction has a lower pressure angle. The opposite side has a pressure angle larger than average. With a left hand pinion, as shown in Figs. 12 and 13, the side driving in counter-clockwise direction has the lower pressure angle.

The effect of a larger inclination $i$ of some portions of the pitch curve on the tooth action and tooth profiles will now be further described with reference to Figs. 16 to 18 which are partial mid-sections taken perpendicular to the pinion axis.

Fig. 16 shows a drive constructed in accordance with the present invention and having equal pressure angles on the two sides. Here the limit pressure angle $\varphi_0$ is kept substantially smaller through the use of a small pinion diameter. Tan $\varphi_0$ in Equation 1a or 1 is kept moderate in spite of an angle $i$ of at least $45°$, by keeping $r_p$ small. The pinion is denoted at 56 and the gear at 55. The pinion axis is at 194. The tooth action is here moderately unbalanced. Tooth contact is shown at pitch point 195 on the side whose pressure angle is closer to the limit pressure angle. On this side the tooth profile 196 of the gear is convex, while it is concave on the other side 197.

The path of contact is not shown in this figure. It passes through pitch point 195 on the side 196 and is inclined to the pitch plane 151 at about the difference of the pressure angle from the limit pressure angle. On the opposite side 197, the path of contact passes through point 198 and is inclined to the pitch plane at about the (absolute) sum of the pressure angle and the limit pressure angle.

If the limit pressure angle $\varphi_0$ were zero, as it is on a spur pinion and face gear transmitting uniform motion, the path of contact would be equally inclined on the two sides; and the gear tooth profiles would be approximately straight.

Fig. 17 refers to a drive having a larger pinion 203, a pinion large enough as compared with the varying ratio face gear 209 to result in a limit pressure angle equal to the actual pressure angle at pitch point 205. This condition results in zero inclination of the path of contact on that side at pitch point 205. This condition can, however, be realized only if the pinion has zero addendum. As it is, the side 206 of the gear tooth is undercut even above pitch point 205, and does not partake in the tooth action in the position shown. The undercut is made by the point of a shaping tool which represents the pinion but which has slightly longer teeth to provide some clearance at the tooth tops. Even if it were made exactly like the pinion, without addition of metal on its outside diameter, the portion 206' of the gear tooth would still be produced only with the outside edge of the pinion profile, and would still be undercut as shown. The resulting edge contact between the outside edge of the pinion teeth and the undercut side of the gear teeth is undesirable, and useless. It may also lead to rapid destruction of the teeth through something like a cutting action.

Some proper tooth contact on side 206 is left near the top of the gear teeth, but not enough to give sufficient duration of contact. The undercut conditions vary along the length of the gear tooth. They are worse at the end closest to the gear axis, and they are better at the opposite end. Fig. 17 shows a midsection, taken through the pitch point. It gives an average picture.

Teeth such as shown in Fig. 17 are undesirable.

When the largest inclination angle $i$ of the pitch curve is $45°$, as in Fig. 10, the gear pitch radius $r$ at this point is $r_0 \cos 45°$. This results in a limit pressure angle $\varphi_0$ equal to a given pressure angle of $20°$ at the midsection when:

$$\tan \phi_0 = .364 = \frac{r_p}{r} \tan i = \frac{r_p}{.707 r_0}$$

and:

$$\frac{r_p}{r_0} = .257$$

The pitch radius $r_p$ is then 25.7% of the maximum pitch radius $r_0$ of the gear, for straight teeth.

When the angle $i$ is $60°$, as in Fig. 11, then a pitch radius $r_p$ of 14.9% of the maximum pitch radius $r_0$ gives a limit pressure angle of $20°$ and produces the condition illustrated in Fig. 17.

In accordance with my invention pinions of smaller radii $r_p$ are used.

Fig. 18 illustrates the condition when a pinion 213 having a pinion pitch radius $r_p$ substantially larger than in Fig. 17 is used. Then the limit pressure angle $\varphi_0$ at pitch point 215 is larger than the actual pressure angle.

The whole side 216 of the gear tooth is produced with the top of the cutter and could give undesirable edge contact only. Difficulties begin to appear even on the opposite side 217. In the turning position shown, contact is at point 218 which lies on the tooth normal 215—218 passing through the pitch point 215. The top point of the pinion profile 219 gets into contact in a position 220, when the pitch point has moved to position 215'. The tooth normal 220—215' passes through pitch point 215'. The path of contact 218—220 is seen to be very steep. The duration of contact in this midsection is only about half a pitch. This side suffers from short duration of contact. The duration of contact on the whole length of the tooth should at least be one full pitch and preferably more.

In Fig. 16, the path of contact (not shown) on the side 197 would not be as steep; and a sufficient duration of contact is achieved on that side.

Reversal curves

By making use of the limit pressure angle, we are able to further improve the cycle efficiency. This is done by modifying part of the pitch curve, the connecting portions of the circular arc $k$ (Fig. 11), with another circular arc $k''$. These portions act during reversal and may be called the reversal curves.

The pitch curve 170 of Fig. 11 has its largest limit pressure angle at the end points 161, 162 of circle $k$. The connecting portions may be made convex (Fig. 19) so that a pitch curve 270 is achieved which comes closer to the turning center 264 than it would if it had straight connecting portions passing through the same end points 261, 262 of circle $k$. This means that less time is lost during reversal and return.

The connecting portions 260 of pitch curve 270 are not made convex indiscriminately, but just so much that no difficulties arise through an increase in limit pressure angle. In accordance with my invention, they may be made curves of constant limit pressure angle. This will be described in detail for straight teeth, for which the limit pressure angle is given by Equation 1a. The principles can also be applied to helical teeth, using Equation 1.

Equation 1a shows that a constant limit pressure angle is attained when $$\frac{\tan i}{r}$$

is constant on the two curves 260, which extend inwardly from the juncture points 261, 262 with circle $k$.

When point 261 is turned about the gear center 264 to its position 261' on the projected pinion axis 261'—264, its tangent 271 at position 261' is inclined at the angle $i$ to the peripheral direction 272 at that point, and is also inclined at angle $i$ to a line 264—273 drawn through the gear center 264 parallel to the peripheral direction. Point 273 is the intersection point of that line with said tangent 271. Distance 264—273 is then:

$$\frac{(264—261')}{\tan i} = \frac{r}{\tan i}$$

This is the quantity which is to be kept constant. Thus at any other point, such as inner end point 265 turned into position 265', the tangent 265'—273 also passes through point 273. Accordingly the sought curve can be described as the path of a point moving on a radial line 264—261' at such a rate relative to a rotating disc that the tangent to the described curve passes through a fixed point 273. In mathematical terms, and with $$\tan i = -\frac{dr}{r d\theta}$$

then:

$$\frac{\tan i}{r} = -\frac{dr}{r^2 d\theta} = \text{constant} = \frac{\tan i_1}{r_1}$$

where $i_1$ and $r_1$ refer to the point 261', and where $\theta$ is the turning angle of the disc measured from the point 261.

Hence:

$$\int -\frac{dr}{r^2} = \frac{1}{r} - \frac{1}{r_1} = \frac{\tan i_1}{r_1} \text{arc } \theta$$

$$\frac{1}{r} = \frac{1}{r_1}(1 + \tan i_1 \text{ arc } \theta)$$

The arc measure is the same as radian measure.

The inner end points 265 and 266 of opposite curves 260 are connected by any suitable curve, as by a circular arc $k_1$ and straight portions 265—267 and 266—268 tangent to both the arc $k_1$ and the respective curve portions 260.

Pitch curves, in which circle $k$ is replaced by another symmetrical or non-symmetrical curve, may also be used, for purposes other than attaining a uniform slide velocity.

Offset pinion

Figs. 20 to 22 illustrate an embodiment with a modified varying ratio drive. Here the cylindrical pinion 300 has helical teeth 301, and is offset from the axis 302 of the face gear 303. The direction of offset shown decreases the inclination of the teeth on the face gear as compared with the helix angle of the pinion. Thus, the teeth 304 of the gear are less inclined to a radial line 305 passing through the gear axis 302 than the helix angle of the pinion teeth. I have discovered that this direction of offset decreases the unbalance of the tooth action on the two sides of the helical pinion teeth, and thereby tends to reduce undercut especially when the pressure angle is equal on the two sides of the pinion teeth.

When a shaft offset is used, the pitch curves have a modified meaning. Without shaft offset, the pitch curve contains the points of rolling contact in a given pitch plane of the face gear. With shaft offset, there are no points of pure rolling contact. But a pitch point remains a point of intersection of a pair of opposite contact normals. At a pitch point, the pinion and gear move relative to each other only in the direction of the contacting pitch lines. They have the same velocity components in a direction normal thereto.

At a given shaft offset and helix angle of the pinion, the pitch curve 306 of the gear can be constructed from a given pitch curve of the character described and corresponding to zero shaft offset. Thus, a pitch point 307 on radial line 305 has a corresponding pitch point 307' on the projection of the pinion axis to the pitch plane. The radial line 305 and the projected pinion axis 308 are parallel; and point 307' is obtained as the intersection point of the projected pinion axis 308 with a line 307—307' in the normal plane of the pinion. This line lies also in the pitch plane and includes an angle $(90° - \psi)$ with radial line 305.

Conversely, if point 307' is given, the corresponding point 307 of the pitch curve without shaft offset is obtained by the same construction.

When this construction is repeated for many turning angles, the corresponding points of the new pitch curve 306 are obtained for the same turning angles of the face gear. In this way one pitch curve can be constructed point by point from the other.

Pitch curve 306 is ordinarily unsymmetrical, even if the pitch curve at zero shaft offset is symmetrical and represents a symmetrical varying motion.

The embodiment of Figs. 20 to 22 also shows a novel way of mounting helical pinions of small diameter as compared with their length. In this way such small pinions become practically feasible; whereas they would be impractical when mounted in a conventional manner; they would deflect too much under load.

One advantage of relatively small pinion diameters is reduced unbalance of the tooth action on the opposite sides of the teeth, so that larger inclinations $i$ of the pitch curve are feasible without resulting in excessive limit pressure angles. This, in turn, permits a longer working cycle as compared with the total cycle, so that a higher efficiency is attainable. A further advantage is a reduction in the overall size. This further advantage is not confined to varying ratio gearing, but is generally applicable also with cylindrical gears and other gears meshing with a helical or spiral pinion.

*Pinion mounting*

The pinion 300 is driven by a gear 310, to which power may be applied in any suitable known way, as by a further pinion 311 shown fragmentarily in Fig. 21. The pinion 300 and gear 310 are mounted in a conventional anti-friction bearing 312, capable of taking axial thrust loads in both directions, as well as radial load. This bearing is rigidly secured to the hub 313 of gear 310, which in turn is rigidly secured to the pinion 300.

Bearing against the outer ends of the helical pinion teeth are two cylindrical rollers 315, 316 shown in cross section in Fig. 22. These are rotatably mounted on axes parallel to the pinion axis 318 (Fig. 21). They have cylindrical outside surfaces 315', 316' which roll on the cylindrical surface constituted by the tips of the pinion teeth. These rollers are rotatably mounted adjacent their opposite ends on stationary axles 320, which are held in projections 321 (Fig. 20) of a supporting member 322. The rollers 315, 316 support the pinion 300 on nearly all of its working length. Since the rollers are larger than the pinion and more rigid, they supply the mounting rigidity which would otherwise be lacking. They have the function of a second bearing, especially constructed to reduce deflection.

If desired, clearance between the tops of the gear teeth and the tooth bottoms of the helical pinion teeth may be omitted, so that said tops may contact with said tooth bottoms.

A modified form of special bearing is shown in Fig. 23, which like Fig. 22 is a partial cross section, but on a larger scale. Here a plurality of cylindrical rollers 325 of smaller diameter than the pinion 300 are provided, and also arranged with their axes parallel to the pinion axis 318. They extend through the greater part of the working length of the pinion and are journaled in a combination bearing member 326 rigid with a support 322'. While they roll on the cylindrical outside surface of the helical pinion teeth, their outside surfaces are rotatably supported on the opposite side by partial cylindrical grooves 327 of the bearing member 326. The latter may be made of either metal or non-metal, for instance, of nylon.

Since the rollers 325 are directly supported opposite to the region of rolling contact, they provide the required stiffness. They roll on the cylindrical outside surface of the pinion teeth rather than slide thereon because of the larger coefficient of friction in this region. The load is more concentrated and there is less effective lubrication than at the cylindrical bearing surfaces 327 on the opposite side.

On unidirectional drives, rollers may sometimes be dispensed with entirely, the outside of the pinion teeth being directly supported by a partial bearing. In this case said ends are slightly inclined to the periphery to form oil wedges.

*Changeable face gears*

Referring again to Fig. 20, the pinion supporting member 322 is constructed as a slide, movable on base 330 in the direction of the pinion axis. This design permits using a controlled motion of the slide 322 for slightly modifying the motion of the main slide 331 and the shape produced on the work piece. It is known as modified roll in gear generation. It also provides the opportunity of pushing the slide aside so that a different face gear can be secured to the rotary member 332 embodying a different motion.

For the purpose of interchange, the varying ratio face gear 303 is rigidly secured to a disc 333 of a shaft member 334 by means of a known tooth face coupling 335. Its teeth are held in tight engagement by screws 336 threading into disc 333.

To change a face gear, the screws 336 are unscrewed and taken off, with the slide 322 in its extreme position to the right, and with the rotary member 332 turned a half turn from the position shown. The face gear 303 is then taken off and replaced by another one. Thereafter the screws 336 are put back on and tightened; and the slide 332 is advanced into operating position.

*General design of device*

The rotary member 332 comprises a shaft member 334 which is rigidly and permanently secured to a head member 338 by means of a toothed face coupling 340. Rigid engagement of the coupling teeth is attained through the pressure of a screw 341 which threads in the member 334. Rotary member 332 is rotatably mounted in an axially fixed position by anti-friction bearings 342, 343 held by a stationary part 344.

As in the other described embodiments, the head 338 contains a slot (not shown) in which a part 345 is adjustable which carries a crank pin 346. A roller or sliding block 347 is rotatably mounted thereon, and engages a straight slot 348 provided in the main slide 331. The slot 348 extends in a direction transverse of the direction of motion of the slide. Thus slot 348 may extend in the direction of the drawing plane of Fig. 20 while the slide motion is perpendicular thereto.

*The production of the varying ratio face gear*

The face gear may be cut with a reciprocatory tool representing the pinion. With helical pinion teeth, helical reciprocation is used, as is common on gears transmitting uniform motion. The gear ratio between the tool and the face gear should change exactly as it does on the pinion and face gear.

This changing ratio may be attained in two ways, either from a marked up or punched tape which governs the ratio in a known manner, or from a master. The latter procedure, however, still requires making a master first. It can be cut from computed settings, much in the manner of making special cams. On gears for producing a uniform slide motion, the working portion can also be generated mechanically because of the simple relationship between the uniform turning motion of the pinion and the turning angle $\theta$ of the gear. An auxiliary slide is fed in the same direction as the main slide in direct proportion to the turning angle of the pinion. 154—156 in Fig. 10 may be the direction and the amount of slide travel from the mean position. This slide contains a straight slot (not shown) passing through point 156 and perpendicular to line 156—154. The slot is engaged by a pin or roller centered at 156 and rigid with the gear axis 64. The displacement of the auxiliary slide thus controls the turning angle of the gear in the required way. The gear is turned through engagement of the pin with said slot.

The gear can also be ground or milled as will now be described with reference to Fig. 24, at first for straight teeth. A pair of coaxial form-grinding wheels 350, 351 with axis 352, are mounted to reciprocate in the direction of the axis 353 of the pin 354. As the wheels are reciprocated, they describe opposite sides 355, 356 of a tooth space of pinion 354. In place of the wheel pair, 350, 351, a single wheel may be used, also representing a tooth space of the pinion. The stroke may be long enough to cover the entire length of the pinion in each stroke; or else shorter strokes may be used, little longer than the maximum face width of the gear. In the latter case, the stroke range is shifted as the gear turns on its axis so that the stroke always covers at least the width of the gear teeth in the zone of engagement.

Such shift may be hydraulically operated and controlled through a cam rigid with the work spindle.

Preferably the work, that is the face gear to be ground, is indexed after each grinding pass. With straight teeth it is indexed by one tooth or one pitch during each return stroke of the wheels, while the wheels are clear of the work. The work motion may be controlled by a master gear pair of increased size, whose gear member is kept rigid with the work. The master pinion is preferably kept coaxial with the pinion 354 represented by the reciprocating wheels. The pitch cylinder and pitch plane of the master gear pair are indicated by dash and dot lines 360, 361 in Fig. 24, while those of the pinion 354 and gear bear numerals 362, 363.

The grinding wheels 350, 351 are not indexed about the pinion axis, while the gear is indexed. They stay in place.

In addition to the indexing motion there is also a very slow rolling generating motion imparted to the work, in which the master pinion rolls and meshes with the master gear. The work is turned together with the master gear, while in this generating motion the grinding wheels move together with the master pinion, and are slowly turned about the pinion axis 353. Fig. 24 shows a central position of the generating roll, in which the gear tooth surfaces are enveloped. At the end of the operation both sides of the teeth are finish ground.

When the pinion teeth are helical, the wheels are set to the required helix angle and they are reciprocated at a uniform speed in the direction of the axis of the pinion while the work turns continuously together with the master gear. The master pinion then turns at a uniform rate, but the grinding wheels do not partake of this motion. However, they partake of the described rolling generating motion, which is the same as for straight teeth.

When the stroke is shorter than the working length of the pinion, and the region of the stroke is changed as the gear turns around, this shift also requires a corresponding change in timing, that is, a corresponding additional or subtractive turning angle of the master pinion. Per axial shift equal to the lead of the pinion represented by the grinding wheels, the timing should be changed by a full turn of the master pinion, as is readily understood.

A stroke as long as the working length of the pinion avoids shifting the stroke and changing the timing.

The term "reciprocation" and its derivates as used in the claims is intended to cover straight line as well as angular to and fro motion.

While the invention has been described in connection with several different embodiments thereof, it is capable of further modifications, and this application is intended to cover any variations, uses, or adaptations of the invention following, in general, the principles of the invention, and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. In combination, a reciprocable member, and means for reciprocating said member comprising a rotary crank member, a crank pin adjustable thereon to different distances from the axis of said crank member and operatively connected to said reciprocable member, and a pair of varying ratio gears for turning said crank member, said gears having different numbers of teeth, and the gear with the larger tooth number being rigidly secured to said crank member.

2. In combination, a reciprocable member, and means for reciprocating said member comprising a rotary crank member, a crank pin adjustable thereon to different distances from the axis of said crank member and operatively connected to said reciprocable member, and a pair of varying ratio gears for turning said crank member, said gears having different numbers of teeth, and the gear with the larger tooth number being rigidly secured to said crank member and being a face gear, and the mating gear being a cylindrical pinion.

3. In combination, a reciprocable member, and means for reciprocating said member comprising a rotary crank member, a crank pin adjustable thereon to different distances from the axis of said crank member and operatively connected to said reciprocable member, and a pair of varying ratio gears for turning said crank member, said gears having different numbers of teeth, and the gear with the larger tooth number being rigidly secured to said crank member and being a face gear, and the mating gear being a cylindrical pinion whose tooth profiles are constant from end to end of its teeth.

4. Mechanism for effecting a reciprocating motion comprising a reciprocable slide having a straight slot extending transversely to the direction of its motion, and means for reciprocating said slide comprising a rotary crank member, a crank pin adjustable on said crank member radially of the axis of said crank member and operatively connected to said slot to reciprocate said slide on rotation of said crank member, and a pair of varying ratio gears for rotating said crank member, said gears having different numbers of teeth, the gear with the larger tooth number being rigidly secured to said crank member.

5. Mechanism for effecting a reciprocating motion comprising a reciprocable slide having a straight slot extending transversely to the direction of its motion, and means for reciprocating said slide comprising a rotary crank member, a crank pin adjustable on said crank member radially of the axis of said crank member and operatively connected to said slot to reciprocate said slide on rotation of said crank member, and a pair of varying ratio gears for rotating said crank member, said gears having different numbers of teeth, the gear with the larger tooth number being rigidly secured to said crank member and being a face gear, and the other gear of said pair being a cylindrical pinion.

6. Mechanism for effecting a reciprocating motion comprising a reciprocable slide having a straight slot extending transversely to the direction of its motion, and means for reciprocating said slide comprising a rotary crank member, a crank pin adjustable on said crank member radially of the axis of said crank member and operatively connected to said slot to reciprocate said slide on rotation of said crank member, and a pair of varying ratio gears for rotating said crank member, said gears having different numbers of teeth, the gear with the larger tooth number being rigidly secured to said crank member and being a face gear, and the other gear of said pair being a cylindrical pinion, said face gear having at least four times the number of teeth of said pinion.

7. In combination, a reciprocable slide having a straight slot which extends transversely to the direction of its reciprocation, means for reciprocating said slide comprising a rotary crank member, a crank pin adjustable on said crank member to different distances from the axis of said crank member and operatively connected to said slot to effect reciprocation of said slide on rotation of said crank member, and a pair of varying ratio gears for rotating said crank member, said gears having different numbers of teeth, the gear with the larger tooth number being rigid with said crank member, an oscillatory member, and means operatively connecting said slide to said oscillatory member to effect oscillatory motion of said oscillatory member in direct proportion to the linear motion of said slide.

8. Mechanism for effecting a reciprocating motion comprising a reciprocable slide having a straight slot disposed transversely of the direction of motion of said slide, a rotary crank member, a crank pin adjustable on said crank member, a main roller rotatably mounted on said crank pin and extending into said slot and engaging one side thereof, a resilient roller contacting said main roller and the opposite side of said slot to effect a preload, means for maintaining said resilient roller in position during operation of the mechanism, and means for driving said crank member.

9. Mechanism for effecting a reciprocating motion comprising a reciprocable slide having a straight slot disposed transversely of the direction of motion of said slide, a rotary crank member, a crank pin adjustable on said crank member, a main roller rotatably mounted on said crank pin and extending into said slot and engaging one side thereof, a ring-shaped resilient roller contacting said main roller and the opposite side of said slot to effect a preload, a cage member on which said resilient roller is mounted, said cage member being slidable in said slot, and gearing for driving said crank member.

10. Mechanism for effecting a reciprocating motion comprising a reciprocable slide having a straight slot disposed transversely of the direction of motion of said slide, a rotary crank member, a crank pin radially adjustable on said crank member, a main roller rotatably mounted on said crank pin and extending into said slot and engaging one side thereof, a ring-shaped resilient roller contacting said main roller and the opposite side of said slot to effect a preload, a cage member on which said resilient roller is mounted, said cage member being slidable in said slot, and a pair of varying ratio gears for driving said crank member, said gears having different numbers of teeth, the gear with the larger number of teeth being rigidly secured to said crank member.

11. Mechanism for effecting a reciprocating motion comprising a slide having a straight slot disposed transversely of its direction of motion, a rotary crank member, a crank pin adjustable radially on said crank member to different distances from the axis of said crank member, means operatively connecting said crank pin to said slot to effect reciprocation of said slide on rotation of said crank member, and means for driving said crank member comprising a face gear rigid with said crank member, and a wide-faced pinion meshing with said gear, said face gear having teeth arranged in a closed curve extending about the axis of said crank member at a varying distance therefrom.

12. Varying-ratio reduction gearing comprising a face gear and a cylindrical pinion, said face gear having a greater number of teeth than said pinion and having its teeth arranged in a closed pitch curve extending around its axis at a varying distance therefrom, said pitch curve lying in a plane perpendicular to the axis of the face gear and tangent to the pitch surface of said pinion, the curvature radius of said pitch curve at the point of maximum distance from the gear axis being smaller than said maximum distance.

13. Varying-ratio reduction gearing comprising a face gear and a cylindrical pinion, said face gear having a greater number of teeth than said pinion and having its teeth arranged in a closed pitch curve extending around its axis at a varying distance therefrom, said pitch curve lying in a plane perpendicular to the axis of the face gear and tangent to the pitch surface of said pinion, the curvature radius of said pitch curve at the point of maximum distance from the gear axis being smaller than said maximum distance, the face width of said gear being larger at said maximum distance than at the minimum distance of said pitch curve from the gear axis, and said pinion having teeth of constant profile shape from end to end.

14. Varying-ratio reduction gearing comprising a face gear and an elongated pinion, said pinion having fewer teeth than said gear and being mounted so that its axis intersects the axis of said gear, and said face gear having teeth arranged along a closed pitch curve extending about its axis at a varying distance therefrom, said pitch curve lying in a plane perpendicular to the gear axis and tangent to a cylindrical pitch surface of said pinion and being symmetrical with respect to a radial line extending in said plane through the axis of said gear, the portion of said pitch curve adjacent its maximum distance from said gear axis being an arc of a circle which passes through said axis.

15. Varying-ratio reduction gearing comprising a face gear and an elongated pinion, said pinion having fewer teeth than said gear and being mounted so that its axis intersects the axis of said gear, and said face gear having teeth arranged along a closed pitch curve extending about its axis at a varying distance therefrom, said pitch curve lying in a plane perpendicular to the gear axis and tangent to a cylindrical pitch surface of said pinion and being symmetrical with respect to a radial line extending in said plane through the axis of said gear, the portion of said pitch curve adjacent its maximum distance from said gear axis being an arc of a circle which passes through said axis, said arc extending through an angle of at least 180°, and said pinion being cylindrical and having straight teeth.

16. Varying-ratio reduction gearing comprising a face gear and an elongated cylindrical pinion mounted on an axis intersecting the axis of said face gear, said face gear having teeth arranged along a closed pitch curve extending around its axis at a varying distance therefrom, said pitch curve lying in a plane perpendicular to the last-named axis and tangent to a cylindrical pitch surface of said pinion, said pitch curve being composed of portions of different curves, the portion of the pitch curve adjacent its maximum distance from the gear axis having a curvature radius smaller than said maximum distance and at its opposite ends being inclined to the peripheral direction of said gear at angles of at least 45°, said pinion having an outside diameter smaller than half the length of its teeth.

17. Varying-ratio reduction gearing comprising a face gear and an elongated cylindrical pinion mounted on an axis intersecting the axis of said face gear, said face gear having teeth arranged along a closed pitch curve extending around its axis at a varying distance therefrom, said pitch curve lying in a plane perpendicular to the last-named axis, and tangent to a cylindrical pitch surface of said pinion, said pitch curve being composed of portions of different curves, the portion of the pitch curve adjacent its maximum distance from the gear axis having a curvature radius smaller than said maximum distance and at its opposite ends being inclined to the peripheral direction of said gear at angles of at least 45°, said pinion having an outside diameter smaller than one-fifth the maximum outside radius of the teeth of said gear.

18. Varying-ratio reduction gearing comprising a face gear and an elongated helical pinion mounted on an axis offset from the axis of said face gear, the offset being in a direction to reduce the inclination of the gear teeth to radii passing through the gear axis, the teeth of said face gear being arranged along a closed pitch curve extending around the gear axis at a varying distance therefrom, said pitch curve lying in a plane perpendicular to the last-named axis and tangent to a cylindrical pitch surface of said pinion, the curvature radius of said pitch curve at the point of its maximum distance from the gear axis being smaller than said distance.

19. Varying-ratio reduction gearing comprising a face gear and a meshing, elongated pinion mounted on an axis angularly disposed to the axis of said gear, said gear having its teeth arranged along a closed pitch curve extending about the gear axis at a varying distance therefrom, the curvature radius of said pitch curve at the point of its maximum distance from the gear axis being smaller than two-thirds of said maximum distance, said pinion being rotatably mounted in a fixed axial position on a plurality of bearings of which one is disposed on the side of the pinion closer to the gear axis, said one bearing being a radial bearing free of thrust.

20. Varying-ratio reduction gearing comprising a face gear and a meshing, elongated helical pinion mounted on an axis angularly disposed to the axis of said gear, said gear having its teeth arranged along a closed pitch curve extending around its axis at a varying distance therefrom, the curvature radius of said pitch curve at the point of its maximum distance from the gear axis being smaller than two-thirds of said maximum distance, said pinion having less than a quarter of the number of teeth of said gear and having an outside diameter less than one-half its face width, and means for supporting said pinion comprising a bearing disposed at a greater distance from the gear axis than the maximum outside radius of the gear teeth, and a pair of cylindrical rollers which contact the cylindrical outside surface of the pinion teeth.

21. Mechanism for effecting a reciprocating motion comprising a slide having a straight slot disposed transversely to the direction of motion of the slide, a rotary crank member having an enlarged head, a crank pin adjustable on said head radially of the axis of said crank member, means operatively connecting said pin with said slot to effect reciprocation of said slide on rotation of said crank member, two axially spaced bearings for rotatably mounting said crank member in axially fixed position, one of said bearings being disposed around the periphery of said head and comprising cylindrical antifriction rollers disposed to take radial load, the other of said bearings being of smaller diameter and disposed back of said head, said other bearing taking axial thrust loads in both directions as well as radial load, and means for driving said crank member comprising a pair of varying ratio reduction gears, one of which has more teeth than the other, the gear with the larger tooth number being secured to said crank member.

22. A gear drive comprising a face gear and a helical pinion, said pinion having a diameter less than half the face width of its teeth, and means for rotatably supporting said pinion including a plurality of rollers arranged parallel to the pinion axis, said rollers being journaled on fixed axes and contacting the tip surfaces of the pinion teeth.

23. A gear drive comprising a face gear and a helical pinion, said pinion having a diameter less than half the face width of its teeth, and means for rotatably supporting said pinion including means engaging the tips of the pinion teeth opposite the region of engagement of the pinion with the gear.

24. Varying ratio reduction gearing comprising a face gear and a cylindrical pinion, said gear having a closed pitch curve in a plane tangent to the pitch surface of said pinion, said curve extending around the gear axis at a varying distance therefrom and comprising portions, which are curves of constant limit pressure angle, and said pinion being more than twice as long as the maximum face width of said gear.

25. Varying ratio reduction gearing comprising a face gear and a cylindrical pinion, said gear having a closed pitch curve in a plane tangent to the pitch surface of said pinion, said curve extending around the gear axis at a varying distance therefrom and being composed of portions, including an outer portion, an inner portion, and side portions, said side portions being convex and being inclined to the peripheral direction at an angle increasing with increasing distances from the gear axis, and said pinion being more than twice as long as the maximum face width of said gear.

References Cited in the file of this patent

UNITED STATES PATENTS

| | | |
|---|---|---|
| 184,413 | Morgan | Nov. 14, 1876 |
| 676,437 | Knoch | June 18, 1901 |
| 696,000 | Beggs | Mar. 25, 1902 |
| 787,956 | Stone | Apr. 25, 1905 |
| 1,209,837 | Harris | Dec. 26, 1916 |
| 2,100,705 | Wildhaber | Nov. 30, 1937 |
| 2,243,206 | Hall | May 27, 1941 |
| 2,307,651 | Waldman | Jan. 5, 1943 |
| 2,366,237 | Clausen | Jan. 2, 1945 |